(12) United States Patent
Kim et al.

(10) Patent No.: US 9,794,380 B2
(45) Date of Patent: Oct. 17, 2017

(54) METHOD FOR EXECUTION CONTROL USING COVER AND ELECTRONIC DEVICE SUPPORTING THE SAME

(71) Applicant: Samsung Electronics Co., Ltd., Suwon-si, Gyeonggi-do (KR)

(72) Inventors: Seokweon Kim, Suwon-si (KR); Kihwan Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 14/300,708

(22) Filed: Jun. 10, 2014

(65) Prior Publication Data

US 2015/0031347 A1 Jan. 29, 2015

(30) Foreign Application Priority Data

Jul. 24, 2013 (KR) ........................ 10-2013-0087170

(51) Int. Cl.
*H04M 3/00* (2006.01)
*H04M 1/02* (2006.01)
*H04M 1/725* (2006.01)

(52) U.S. Cl.
CPC ..... *H04M 1/0245* (2013.01); *H04M 1/72527* (2013.01); *H04M 1/72575* (2013.01)

(58) Field of Classification Search
CPC .................................................. H04M 1/0214
See application file for complete search history.

(56) References Cited

U.S. PATENT DOCUMENTS

| | | | | |
|---|---|---|---|---|
| 2007/0087777 | A1* | 4/2007 | Shibuya | G06F 3/03543 455/550.1 |
| 2007/0123391 | A1* | 5/2007 | Shin | A43B 3/0005 482/8 |
| 2009/0190295 | A1* | 7/2009 | Chin | G06F 1/1618 361/679.27 |
| 2010/0182265 | A1* | 7/2010 | Kim | G06F 1/1616 345/173 |
| 2012/0231730 | A1* | 9/2012 | Liu | G06F 21/86 455/26.1 |

* cited by examiner

*Primary Examiner* — Charles Appiah
*Assistant Examiner* — Alexander Yi
(74) *Attorney, Agent, or Firm* — Jefferson IP Law, LLP

(57) ABSTRACT

A method for execution control using a cover and an electronic device supporting the same are provided. The method includes acquiring a sensing value of a cover sensor included in the cover and a sensing value of a main body sensor included in a main body of the electronic device, due to a physical change generated in the electronic device, comparing the sensing value of the main body sensor with the sensing value of the cover sensor, and controlling execution in the main body according to the sensing value of the cover sensor, when a result of the comparison meets a preset criterion.

18 Claims, 10 Drawing Sheets

FIG. 4
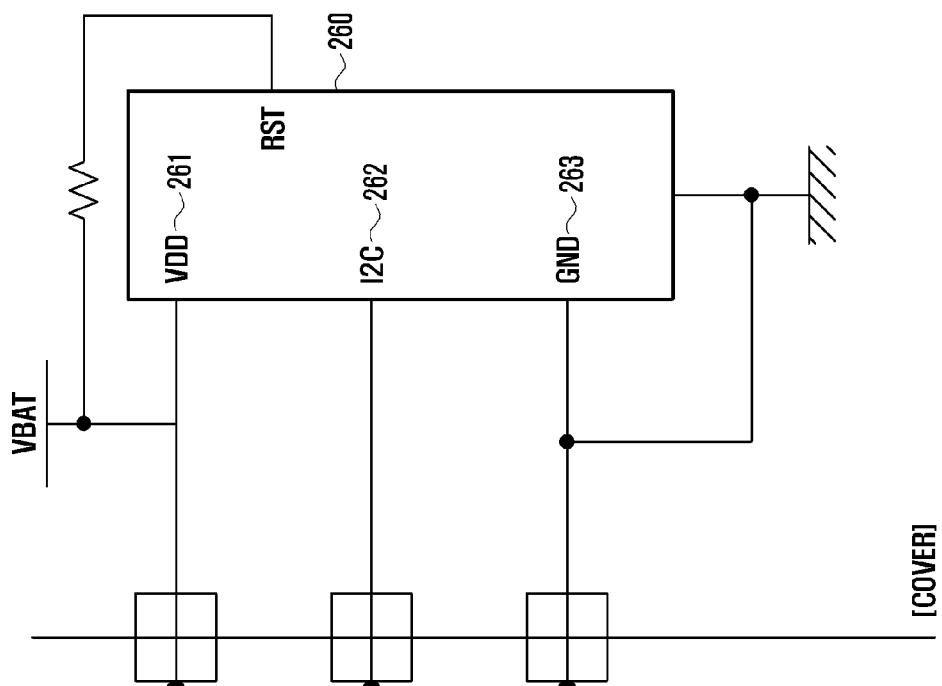
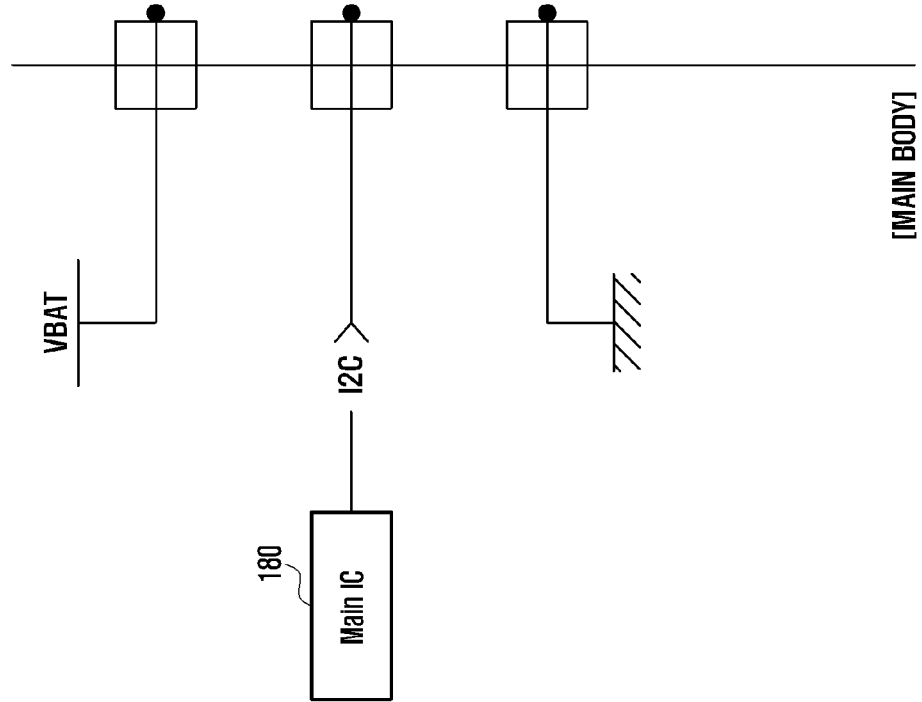

FIG. 5

| DATA OF MAIN BODY SENSOR UNIT | | DATA OF COVER SENSOR UNIT | |
|---|---|---|---|
| GYROSCOPE TEST<br>Count  XValue   Y Value   Z Value<br>1 0.0 0.0 0.0<br>2 -3.175438 -0.3663967 -4.457826<br>3 -0.9770578 -0.24426445 -3.17538<br>4 1.648785 -0.18319835 -3.29757<br>5 2.3205123 -0.54959506 -3.2365038<br>6 2.3205123 -0.54959506 -3.2365038<br>7 2.3815784 0.18319835 -2.4426446<br>8 1.587719 -0.3663967 -3.0533056<br>9 0.91599166 -0.4885289 -2.6258428<br>10 0.42746282 -0.91599166 -3.786099<br>11 0.0 -0.30533057 -2.9311736<br>12 1.1602561 -0.91599166 -3.9082313<br>13 0.67172724 -1.587719 -3.0533056<br>14 1.4045206 -1.587719 -3.0533056<br>15 0.0 0.54959506 -2.9922395<br>16 2.3815784 -0.85492563 -2.5647767 | WHEN FLIP COVER IS NOT USED | GYROSCOPE TEST<br>Count  XValue   Y Value   Z Value<br>1 0.0 0.0 0.0<br>2 -3.846438 -0.3663967 -4.457826<br>3 -0.9910578 -0.24426445 -3.17538<br>4 1.754785 -0.18319835 -3.29757<br>5 1.5781901 -0.54959506 -3.2365038<br>6 2.4785123 -0.54959506 -3.2365038<br>7 2.4785784 0.18319835 -2.4426446<br>8 1.754719 -0.3663967 -3.0533056<br>9 1.01599166 -0.4885289 -2.6258428<br>10 0.47846282 -0.91599166 -3.786099<br>11 0.0 -0.30533057 -2.9311736<br>12 1.1602561 -0.91599166 -3.9082313<br>13 0.75472724 -1.587719 -3.0533056<br>14 1.4785206 -1.587719 -3.0533056<br>15 0.0 0.54959506 -2.9922395<br>16 2.5785784 -0.85492563 -2.5647767 | WHEN FLIP COVER IS NOT USED |
| 17 1.3434545 -0.91599166 -3.29757<br>18 3.9692974 0.4885289 4.274628<br>19 -1.2213223 1.3434545 -3.2365038 | WHEN FLIP COVER IS USED | 17 29.372803 -0.91599166 12.030025<br>18 -32.05971 -81.40113 -91.78237<br>19 -1.5783223 1.3434545 -3.2365038 | WHEN FLIP COVER IS USED |
| X: 4.3967605   Y: 2.9311735   Z: -4.753157 | | X: 4.3967605   Y: 2.9311735   Z: -4.753157 | |
| 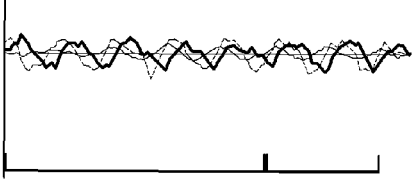<br>WHEN FLIP COVER IS NOT USED    WHEN FLIP COVER IS USED | | 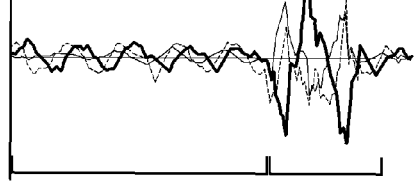<br>WHEN FLIP COVER IS NOT USED    WHEN FLIP COVER IS USED | |

FIG. 9
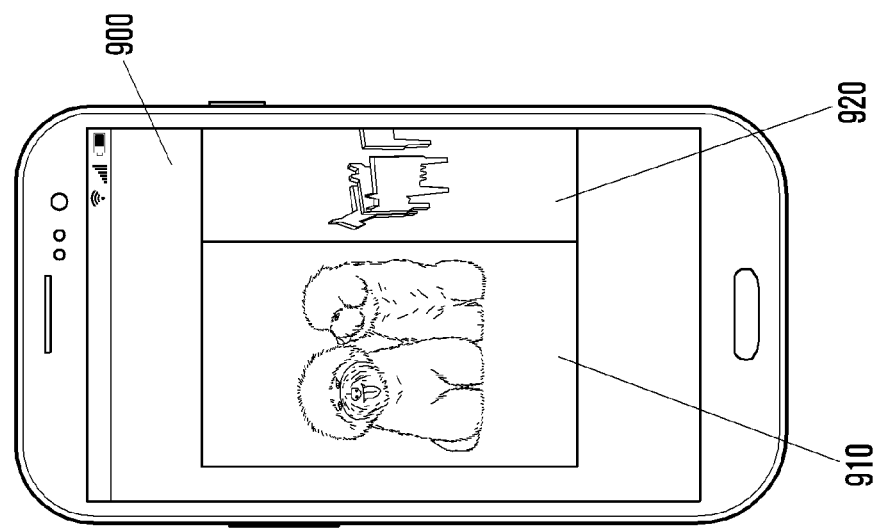
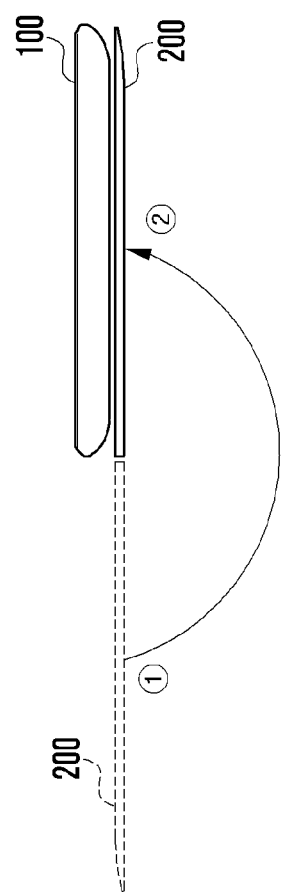

METHOD FOR EXECUTION CONTROL USING COVER AND ELECTRONIC DEVICE SUPPORTING THE SAME

CROSS-REFERENCE TO RELATED APPLICATION(S)

This application claims the benefit under 35 U.S.C. §119(a) of a Korean patent application filed on Jul. 24, 2013 in the Korean Intellectual Property Office and assigned Serial number 10-2013-0087170, the entire disclosure of which is hereby incorporated by reference.

TECHNICAL FIELD

The present disclosure relates to a method for execution control using a cover and an electronic device supporting the same. More particularly, the present disclosure relates to an electronic device which detects a physical change through a sensor included in each of a cover and a main body, compares sensing values of the two sensors, controls execution in the main body according to a physical change amount of the cover only when a result of the comparison meets a preset criterion, and thereby can support more accurate and rapid execution control. The art of the present disclosure can also be applied to a folder phone.

BACKGROUND

Recently, electronic devices have been widely used due to the mobility thereof. Particularly, mobile communication terminals, which can perform voice calls while the mobile communication terminals are on the move, from among electronic devices are portable terminals which are so popular that a large majority of people use such electronic devices. Meanwhile, a mobile communication terminal has a main function of transmitting/receiving call information between a caller and a callee, and may have various other functions. For example, a portable terminal according to the related art may have a Moving Picture Experts Group (MPEG) Audio Layer-3 (MP3) function matched to a file reproduction function, or may have an image collection function matched to a digital camera capable of collecting images. In addition, the portable terminal according to the related art supports a function capable of performing a mobile game, an arcade game, and/or the like.

Meanwhile, recently, users frequently use front covers integrated into one body with battery covers in order to protect touch panels of the portable terminals when users store or use the portable terminals. When such a front cover is mounted on the portable terminal, if the user intends to execute a function of the portable terminal, the user must go through multiple steps, such as a step of opening the front cover and pressing a home key on a main body, a step of cancelling a lock screen, a step of inputting a command which controls execution in the main body, and the like.

Further, when the user does not use the portable terminal during a predetermined time period or longer, the portable terminal has a function in which the portable terminal automatically changes a state thereof to a sleep mode. When such a function is not previously set or when an error occurs in such a function, the display unit of the portable terminal is maintained in a state of being turned on, so that the power consumption of the portable terminal increases.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device which compares sensing values due to physical changes detected through sensors respectively included in a cover and a main body, controls execution in the main body according to the sensing value of the cover sensor only when a result of the comparison meets a preset criterion, and thereby can more accurately and rapidly control the execution.

In accordance with an aspect of the present disclosure, a method for execution control in an electronic device having a cover is provided. The method includes acquiring a sensing value of a cover sensor included in the cover and a sensing value of a main body sensor included in a main body of the electronic device, due to a physical change generated in the electronic device, comparing the sensing value of the main body sensor with the sensing value of the cover sensor, and controlling execution in the main body according to the sensing value of the cover sensor, when a result of the comparison meets a preset criterion.

In accordance with another aspect of the present disclosure, an apparatus for execution control in an electronic device having a cover is provided. The apparatus includes a cover sensor unit, being included in the cover connected to one side of a main body of the electronic device, for detecting a physical change amount of the cover, a main body sensor unit for detecting a physical change amount of the main body, which is matched to the physical change amount of the cover, and a control unit for comparing a sensing value of the cover sensor unit with a sensing value of the main body sensor unit, and controlling execution in the electronic device according to a result of the comparison.

In accordance with an aspect of the present disclosure, a method for execution control in an electronic device having a cover is provided. The method includes detecting a sensing value of a cover sensor included in the cover, detecting a sensing value of a main body sensor included in a main body of the electronic device, comparing the sensing value of the cover sensor with the sensing value of the main body sensor, determining whether a relative difference between the sensing value of the cover sensor and the sensing value of the main body sensor corresponds to a predefined event, and in response to determining that a predefined event occurred based on the sensing value of the cover sensor and the sensing value of the main body sensor, controlling the electronic device to perform a function associated with the predefined event.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a circuit diagram illustrating an example of a circuit that connects a cover sensor unit to a main chip according to an embodiment of the present disclosure;

FIG. 5 is a view illustrating a comparison of data acquired through a cover sensor unit with data acquired through a sensor unit of a main body according to an embodiment of the present disclosure;

FIGS. 6, 7, 8, and 9 are views each explaining an example of execution control using a cover in an electronic device according to various embodiments of the present disclosure.

Throughout the drawings, like reference numerals will be understood to refer to like parts, components, and structures.

DETAILED DESCRIPTION

Figure 1:
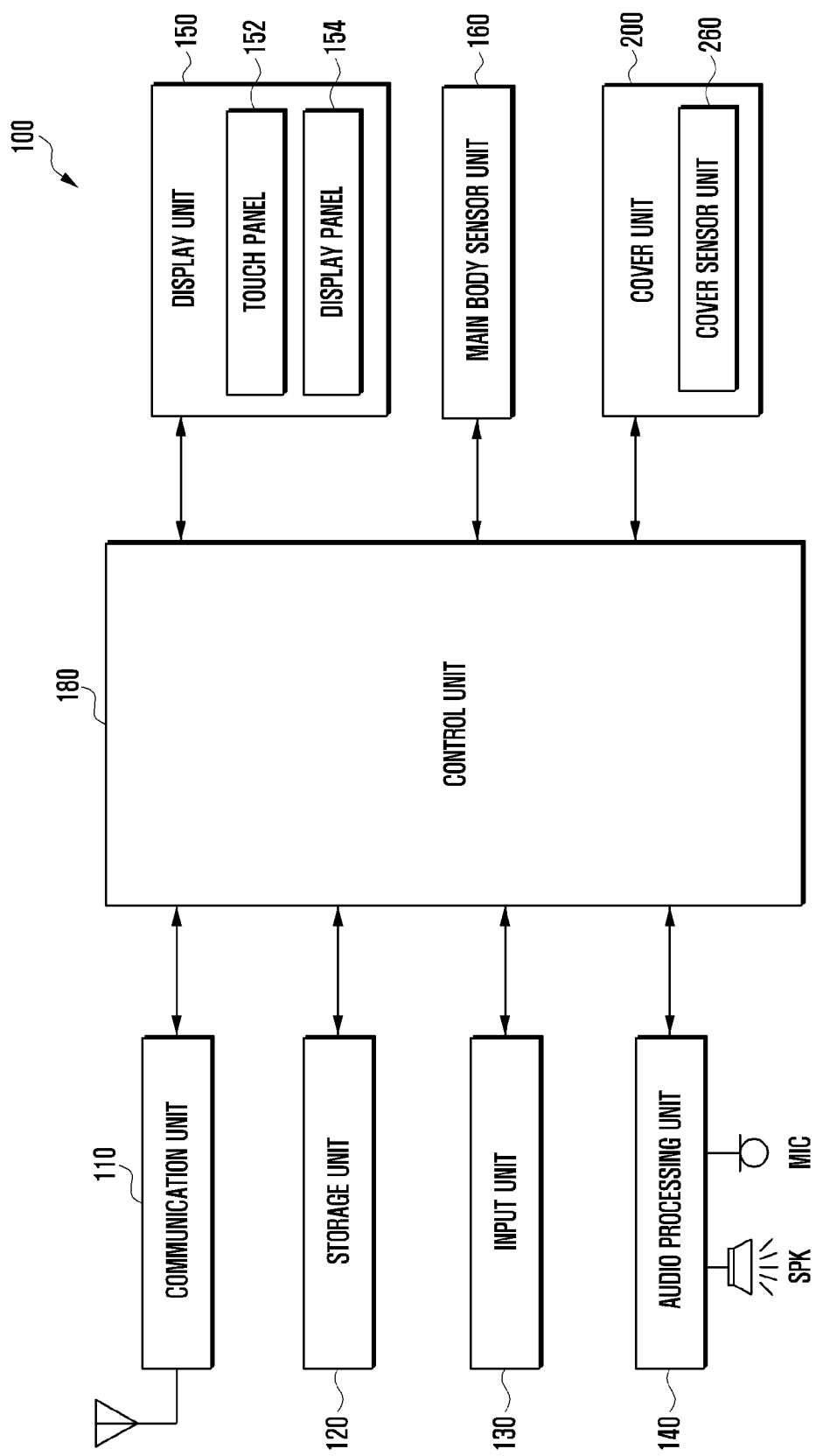
FIG. 1 is a block diagram illustrating a configuration of an electronic device supporting a method for execution control using a cover according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to making a detailed description of the present disclosure, the terms and words used in the present specification and claims should not be interpreted as being limited to their typical meaning based on the dictionary definitions thereof, but should be interpreted to have the meaning and concept relevant to the technical spirit of the present disclosure. Accordingly, the various embodiments described in the present specification and constructions shown in the drawings are only various embodiments of the present disclosure, and do not represent all technical spirits of the present disclosure. Therefore, it should be understood that various equivalents and modified various embodiments capable of replacing the various embodiments of the present disclosure described herein may exist at the time when this application was filed.

Various embodiments of the present disclosure are directed to a method and apparatus applied to various types of information communication devices and various types of multimedia devices. For example, various embodiments of the present disclosure are directed to an electronic device such as a Moving Picture Experts Group-1 (MPEG) Audio Layer-3 (MP3) player, a Portable Multimedia Player (PMP), a Personal Digital Assistant (PDA), a tablet Personal Computer (PC), a mobile phone, a smart phone, a video phone, an e-book reader, a wearable device (e.g., an electronic appcessory, or a smart watch) and/or the like. Hereinafter, a case will be described in which an electronic device according to the present disclosure corresponds to a smart phone.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 is a block diagram illustrating a configuration of an electronic device supporting a method for execution control using a cover according to an embodiment of the present disclosure.

Referring to FIG. 1, the electronic device 100 according to an embodiment of the present disclosure includes a communication unit 110, a storage unit 120, an input unit 130, an audio processing unit 140, a display unit 150, a main body sensor unit 160, and a control unit 180. According to various embodiments of the present disclosure, the electronic device 100 includes a cover that is connected to at least one side of the electronic device 100 and that rotates about at least one axis. For example, the electronic device 100 may include a cover 200 which is connected to one side of the electronic device 100 and rotates about one axis. The cover 200 may include a cover sensor unit 260 mounted inside or outside thereof.

The communication unit 110 may include one or more modules which enable wireless communication between the electronic device 100 and a wireless communication system or between the electronic device 100 and another user device. For example, the wireless communication unit 110 may include a mobile communication module, a Wireless Local Area Network (WLAN) module, a short-range communication module, a location calculation module, a broadcast receiving module, and/or the like. The communication unit 110 may be configured to enable communication between the electronic device 100 and another electronic device 100.

The mobile communication module transmits and receives wireless signals to/from at least one of a base station, an external terminal and a server, via a mobile communication network. Examples of the wireless signal may include a voice call signal, video call signal, data in various forms according to the transmission and reception of text/multimedia messages, and/or the like.

According to the control of the control unit 180, the mobile communication module may connect to a provider server, a content server, and/or the like, and may download content, such as an image file, a moving image file, a sound source file, and/or the like. The mobile communication module may download the content in a file form.

The WLAN module enables the electronic device 100 to wirelessly connect to the Internet, and forms a WLAN link between the electronic device 100 and another electronic device 100 (e.g., another user device). The WLAN module may be mounted inside or outside the electronic device 100. The WLAN module may be configured to communicate using one or more Wireless Internet technologies, such as WLAN (Wi-Fi), Wireless Broadband (WiBro), World Interoperability for Microwave Access (WiMax), High Speed Downlink Packet Access (HSDPA), and/or the like.

The short-range communication module is used for short-range communication. The short-range communication module may be configured to communicate using one or more short range communication technologies, such as Bluetooth, Radio Frequency Identification (RFID), Infrared Data Association (IrDA), Ultra Wideband (UWB), ZigBee, Near Field Communication (NFC), and/or the like. In addition, the short-range communication module may transmit or receive content, which includes metadata, and/or the like to or from another electronic device 100 when the electronic device 100 is connected to another electronic device 100 through short-range communication.

The storage unit 120 may store programs for processing and control performed by the control unit 180, or may temporarily store input/output data. Under the control of the control unit 180, the storage unit 120 may store data generated by the electronic device 100 or data received from an external electronic device 100 (e.g., a server, a desktop PC, a smart phone, and/or the like) through the communication unit 110 or an external device interface unit (not shown).

According to various embodiments of the present disclosure, the storage unit 120 may store a cover control application program for controlling execution in the electronic device 100 according to a change in a tilt of the cover, an angle of the tilt thereof, a movement direction thereof, a movement speed thereof, and/or the like. According to various embodiments of the present disclosure, when a cover control mode is on, the cover control application program may be executed or otherwise run (e.g., by the control unit 180).

According to various embodiments of the present disclosure, the cover control application program may include a routine for controlling on/off of an automatic cover control mode, a routine for detecting a physical change of the cover 200 when the cover control mode is on, a routine for extracting an execution command according to the physical change of the cover 200, a routine for controlling execution in the electronic device 100 according to the extracted execution command, and/or the like.

According to various embodiments of the present disclosure, the storage unit 120 may store information relating to the cover 200. For example, the storage unit 120 may store a range of the tilt of the cover 200.

Figure 7:
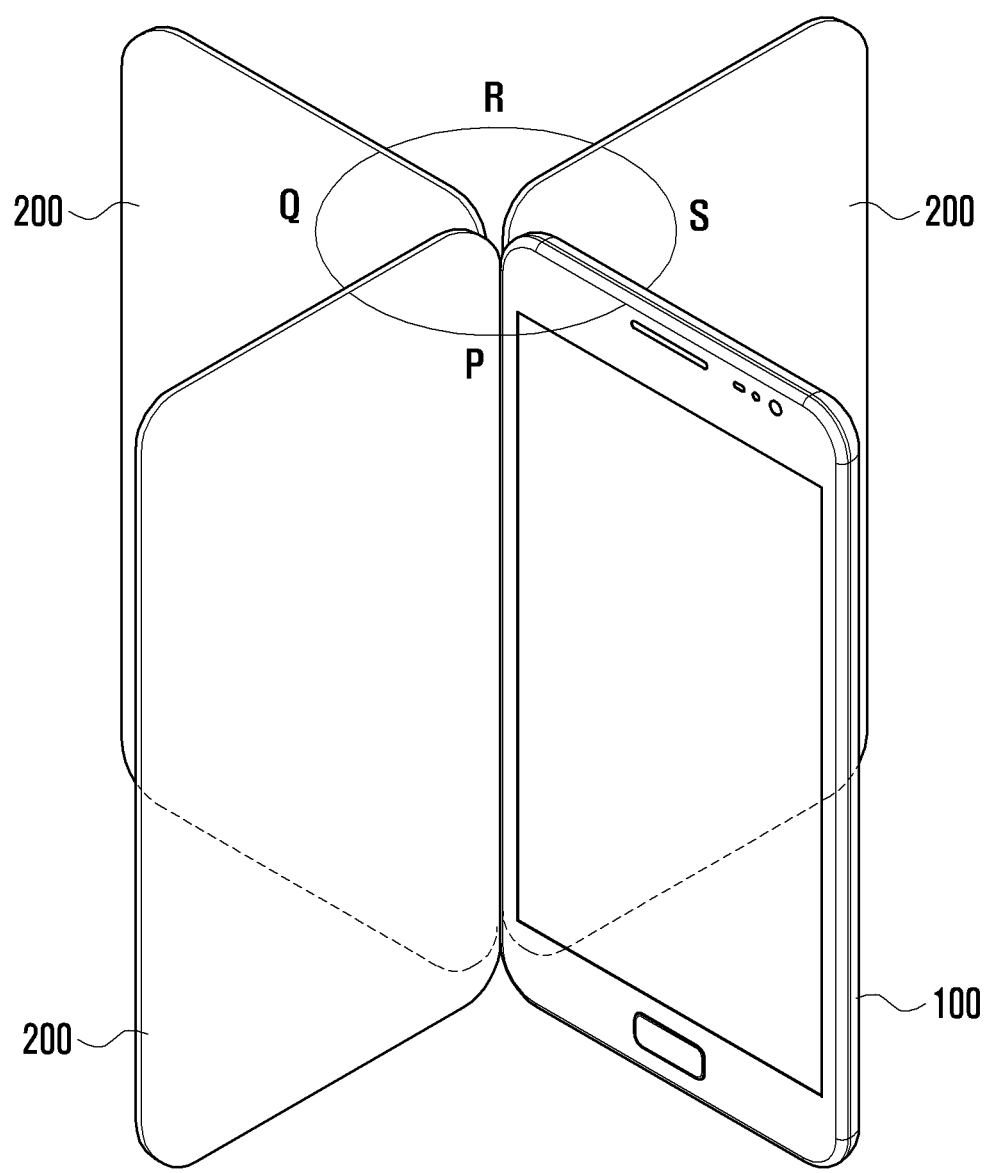

The range of the tilt of the cover 200 may be divided into multiple tilt ranges in a counterclockwise direction with a front surface of a main body of the electronic device 100 as a reference. For example, as illustrated in FIG. 7, the range of the tilt of the cover 200 may be divided into a first tilt range indicated by P representing 0 to 90 degrees, a second tilt range indicated by Q representing 90 to 180 degrees, a third tilt range indicated by R representing 180 to 270 degrees, and a fourth tilt range indicated by S representing 270 to 360 degrees, in a counterclockwise direction with the front surface of the main body of the electronic device 100 as a reference. However, various embodiments of the present disclosure are not limited thereto. Alternatively, the range of the tilt of the cover 200 may be divided into multiple tilt ranges, so as to all have an identical angle or so as to have different angles in a counterclockwise direction with the front surface of the main body of the electronic device 100 as a reference.

According to various embodiments of the present disclosure, the storage unit 120 may store an association between a tilt range and an execution command. For example, the storage unit 120 may store a mapping table represented by Table 1 below obtained by mapping each tilt range to an execution command which controls execution in the electronic device 100. Table 1 below is a mapping table according to various embodiments of the present disclosure for controlling the execution of a call function application according to a change in a tilt of the cover 200 during a cover control mode. The call function application matched to Table 1 below and various embodiments of the present disclosure of the change in the tilt of the cover 200 used to control the execution of the call function application will be described with reference to FIG. 6.

TABLE 1

| Cover control mode | First tilt range (Π) | Second to fourth tilt ranges (Θ~Σ) |
|---|---|---|
| Detection of tilt change | cover is opened and then closed at angle of 0 to 90 degrees | cover is opened and then closed at angle of 90 to 360 degrees |

TABLE 1-continued

| Cover control mode | First tilt range (Π) | Second to fourth tilt ranges (Θ~Σ) |
|---|---|---|
| Extraction of execution command | function of receiving telephone call | function of rejecting reception of telephone call |

Table 2 below is a mapping table according to various embodiments of the present disclosure for controlling the execution of an application of a music player according to a change in a tilt of the cover during a cover control mode. The application of the music player matched to Table 2 below and various embodiments of the present disclosure of the change in the tilt of the cover 200 used to control the execution of the application of the music player will be described with reference to FIG. 8.

TABLE 2

| Cover control mode | First to second tilt ranges (Π~Θ) | Third to fourth tilt ranges (P~Σ) |
|---|---|---|
| Detection of tilt change | cover is opened and then closed at angle of 0 to 180 degrees | cover is opened and then closed at angle of 180 to 360 degrees |
| Extraction of execution command | function of reproducing next music in list | function of reproducing previous music in list |

Table 3 below is a mapping table according to various embodiments of the present disclosure for controlling the execution of an image viewing application according to a change in a tilt of the cover during a cover control mode. The image viewing application matched to Table 3 below and various embodiments of the present disclosure of the change in the tilt of the cover 200 used to control the execution of the image viewing application will be described with reference to FIG. 9.

TABLE 3

| Cover control mode | First to second tilt ranges (Π~Θ) | Third to fourth tilt ranges (P~Σ) |
|---|---|---|
| Detection of tilt change | cover is opened and then closed at angle of 0 to 180 degrees | cover is opened and then closed at angle of 180 to 360 degrees |
| Extraction of execution command | function of displaying next image in list | function of displaying previous image in list |

It will be apparent to those having ordinary knowledge in the technical field of the present disclosure that a range and an execution command matched to the range which are described in each of Table 1, Table 2 and Table 3 are only an example and thus, various embodiments of the present disclosure are not limited thereto. In addition, the mapping table may be changed even after being stored in the storage unit 120.

Further, hereinabove, a case has been described in which execution is controlled by using the change in the tilt of the cover 200 in the electronic device 100. However, various embodiments of the present disclosure are not limited thereto. Alternatively, execution in the electronic device 100 may be controlled by using at least one of a movement speed of the cover 200, a position thereof, a movement direction thereof, an angle of the tilt thereof as well as the change in the tilt of the cover 200, and/or the like.

According to various embodiments of the present disclosure, the storage unit 120 may store together the frequency of use, the level of importance, and priority according to the execution of an application of the electronic device 100. Particularly, an application of which execution is controlled according to a physical change amount of the cover 200 during a cover control mode may be designated by a user or a designer, and the designated application may be stored in the storage unit 120. For example, the application of which the execution is controlled according to the physical change amount of the cover 200 during the cover control mode may be at least one of an application which is currently running in the background, an application having the highest frequency of use, an application selected by the user, and an application previously set by the designer.

The storage unit 120 may store a booting program and an Operating System (OS) for operating the electronic device 100. The storage unit 120 may store an embedded application, a third party application, and/or the like. The term "embedded application" refers to an application installed in the electronic device 100. For example, the embedded application may be a browser, an e-mail, an instant messenger, and/or the like. The term "third party application" refers to an application which may be downloaded from an online market and installed in the electronic device 100, and/or the like. Third party applications may include various types of third party applications. The third party application is freely installed and controlled. When the electronic device 100 is turned on, the booting program is first loaded into a main memory (e.g., a Random Access Memory (RAM)) of the control unit 180. The booting program loads the OS into the main memory so as to enable the electronic device 100 to operate. In addition, the OS loads applications into the main memory, and executes the loaded applications. The relevant booting and loading are a widely-known technology in a computer system, and thus a detailed description thereof will be omitted.

The storage unit 120 may include a storage medium of at least one type from among a flash memory type, a hard disk type, a multimedia card micro type, a memory card type (e.g., a Secure Digital (SD) or eXtreme Digital (XD) memory card), a RAM type, a Static RAM (SRAM) type, a Read Only Memory (ROM) type, a Programmable ROM (PROM) type, an Electrically Erasable PROM (EEPROM) type, a Magnetic RAM (MRAM) type, a magnetic disk type, an optical disk type, and/or the like. The electronic device 100 may also operate in relation to a web storage which performs a storage function of the storage unit 120 on the Internet.

The input unit 130 generates input data that the user inputs in order to control execution in the electronic device 100. The input unit 130 may include a keypad, a dome switch, a touch pad (e.g., static pressure, capacitance, and/or the like), a jog wheel, a jog switch, and/or the like. The input unit 130 may be implemented in the form of buttons on an outer surface of the electronic device 100. Some buttons may be implemented by using a touch panel. According to various embodiments of the present disclosure, during a cover control mode (e.g., when the cover control mode is on or otherwise activated), the input unit 130 includes the cover 200 connected to the electronic device 100. For example, the input unit 130 may include the cover 200 connected to one side of the electronic device 100. The cover 200 may be a unit that receives an execution command as input in order to control execution in the electronic device 100.

The audio processing unit 140 provides an audio signal, which has been received from the control unit 180, to a Speaker (SPK), and provides an audio signal such as a voice and the like, which has been received from a Microphone (MIC), to the control unit 180. According to the control of the control unit 180, the audio processing unit 140 converts sound data, such as voice/sound, into an audible sound and outputs the audible sound, through the SPK. According to the control of the control unit 180, the audio processing unit 140 converts an audio signal such as a voice, and/or the like, which has been received from the MIC, into a digital signal, and provides the digital signal to the control unit 180.

The SPK may output audio data received from the communication unit 110, audio data received as input from the from the MIC, or audio data stored in the storage unit 120, in a call mode, a recording mode, a voice recognition mode, a broadcast receiving mode, an image capturing mode, a situation recognition service execution mode, and/or the like. The SPK may output sound signals related to functions (e.g., the feedback of situation information according to the execution of an action, the reception of a call connection, the transmission of a call connection, image capturing, the reproduction of media content such as a music file and a moving image file, and/or the like) performed by the electronic device 100.

The MIC receives, as input, a sound signal from the outside in the call mode, the recording mode, the voice recognition mode, the image capturing mode, a voice recognition-based dictation execution mode, and/or the like. The MIC may process the received sound signal into electrical voice data. In the call mode, the processed voice data may be converted into a form transmissible to a mobile communication base station through the mobile communication module, and the voice data in the form transmissible to the mobile communication base station may be output. Various noise removal algorithms may be implemented in the MIC in order to remove noise generated in process of receiving the external sound signal as input.

The display unit 150 displays a screen according to execution in the electronic device 100, and detects an input event related to execution control in the electronic device 100. The display unit 150 may include a touch panel 152 and a display panel 154.

The touch panel 152 may be arranged on the display unit 150. For example, the touch panel 152 may be integrated or otherwise included in the display unit 150. Specifically, the touch panel 152 may be implemented as an add-on type touch panel disposed on a front surface of the display unit 150, an on-cell type touch panel inserted into the display unit 150, an in-cell type touch panel, and/or the like. The size of a touch screen may be determined according to the size of the touch panel 152. Examples of the touch panel 152 may include a resistive-type touch panel, a capacitive-type touch panel, an electromagnetic induction-type touch panel, and/or the like.

Under the control of the control unit 180, the display unit 150 converts image data, which has been received as input from the control unit 180, into an analog signal, and displays the converted analog signal. The display unit 150 may provide a screen according to the operation of the electronic device 100 and a screen according to the execution of a user function, for example, a lock screen, a home screen, an application (hereinafter referred to as "App") execution screen, a menu screen, a keypad screen, a message writing screen, an Internet screen, and/or the like.

The display unit 150 may display a pop-up window and/or the like for selecting on/off of a cover control mode, may display an item matched to an execution command which is input by the cover 200 during the cover control mode, and may display a screen showing a result of the execution, which is indicated by the execution command.

The main body sensor unit 160 may be a sensor mounted inside the main body of the electronic device 100, and measures a physical change amount generated in the main body of the electronic device 100. For example, the main body sensor unit 160 may be designed such that the main body sensor unit 160 is disposed in an area spaced apart from the display unit 150, an area outside the display unit 150, and/or the like. The main body sensor unit 160 does not detect an input event such as a touch or a tap generated from the display unit 150, as a physical change amount. According to various embodiments of the present disclosure, a structure of the main body sensor unit 160 and/or the electronic device 100 may be a structure implemented to allow the main body sensor unit 160 to detect a physical change amount of the main body related to a physical change amount generated by the cover 200.

The main body sensor unit 160 may include at least one of a gyroscope sensor, an acceleration sensor, a geo-magnetic sensor, a gravity sensor, a tilt sensor, and/or the like. In addition to the above-described sensors, the main body sensor unit 160 may include at least one of an image sensor, a motion sensor, a temperature sensor, a proximity sensor, an environmental sensor, and/or the like. When a sensor is capable of detecting a physical change of the main body matched to the physical change of the cover 200, the sensor may be included in the main body sensor unit 160.

The control unit 180 controls overall execution in the electronic device 100 and a signal flow between the internal elements of the electronic device 100, processes data, and controls the supply of power from a battery to the elements of the electronic device 100. The control unit 180 may include a main memory which stores an application program and the OS, a cache memory which temporarily stores data to be written to the storage unit 120 and temporarily stores data read from the storage unit 120, a Central Processing Unit (CPU), a Graphic Processing Unit (GPU), and/or the like. The OS manages computer resources, such as the CPU, the GPU, the main memory, the auxiliary memory, and/or the like, while serving as an interface between hardware and a program.

Specifically, the OS operates the electronic device 100, determines the order of tasks, and controls an arithmetic operation of the CPU and that of the GPU. In addition, the OS performs a function of controlling the execution of an application program, a function of managing the storage of data and files, and/or the like.

Meanwhile, as is well known, the CPU is a core control unit of a computer system which performs calculations and comparisons of data, the interpretation and execution of instructions, and/or the like. In place of the CPU, the GPU is a graphic control unit which performs calculations and comparisons of graphic-related data, and the interpretation and execution of instructions, and/or the like. In each of the CPU and the GPU, two or more independent cores (e.g., a quad-core) may be integrated into one package composed of a single Integrated Circuit (IC). Alternatively, the CPU and the GPU may be integrated into one chip (e.g., System on Chip (SoC)). Alternatively, the CPU and the GPU may be packaged in a multi layer. Meanwhile, a configuration including the CPU and the GPU may be referred to as an "Application Processor (AP)."

According to various embodiments of the present disclosure, the control unit 180 has a configuration for controlling various signal flows, the collection and output of information, and/or the like, in order to control execution in the electronic device 100 having the cover 200.

When power is supplied to the electronic device 100, the control unit 180 performs a control operation for initiating the elements of the electronic device 100 by using the supplied power. When the initiation has been completed, the control unit 180 may identify a cover control mode, and may determine whether a current mode is the cover control mode. The cover control mode refers to a mode for controlling execution in the electronic device 100 by using the cover 200 connected to the electronic device 100, and may be configured so as to be automatically turned on when the electronic device 100 is initiated. Alternatively, the cover control mode may be manually configured by a switch, an input key, and/or the like, according to an option of the user.

The control unit 180 drives the main body sensor unit 160 and the cover sensor unit 260. Specifically, the electronic device 100 is supplied with power from an external power source or the battery, and is initiated. The control unit 180 may drive the main body sensor unit 160 and the cover sensor unit 260 by using power supplied from the external power source or the battery.

The control unit 180 senses a physical change through at least one of the main body sensor unit 160 and the cover sensor unit 260. The main body sensor unit 160 may detect a physical change generated in the main body of the electronic device 100. The cover sensor unit 260 may detect a physical change generated in the cover 200. For example, the control unit 180 may control the cover sensor unit 260 to detect a change in a tilt of the cover 200, an angle of the tilt thereof, a movement speed thereof, a movement direction thereof, and/or the like.

The control unit 180 determines and compares a sensing value of the main body sensor unit 160 and a sensing value of the cover sensor unit 260, and determines whether a result of the comparison meets a preset criterion. In other words, the control unit 180 may determine whether a difference between the sensing values acquired through the cover sensor unit 260 and the main body sensor unit 160 meets the preset criterion.

When the result of the comparison meets the preset criterion, the control unit 180 extracts an execution command, which is matched to the sensing value of the cover sensor unit 260, from the above-described mapping table. According to various embodiments of the present disclosure, the control unit 180 may determine a preset tilt range, to which the sensing value of the cover sensor unit 260 belongs among preset tilt ranges of the cover 200.

The control unit 180 controls execution in the electronic device 100, according to the execution command extracted from the mapping table. Specifically, the control unit 180 may control the execution of a relevant application, according to the execution command stored in the mapping table in such a manner as to be mapped to the sensing value of the cover sensor unit 260 belonging to a previously-divided tilt range having a predetermined angle.

According to various embodiments of the present disclosure, the cover unit 200 is provided with a structure in which the cover unit 200 is connected to one side of the electronic device 100 and rotates about one axis. The cover 200 may rotate about an axis so as to expose a front surface of the display unit 150 when the cover 200 is opened (e.g., in relation to the display unit 150) or covers a front surface of the display unit 150 when the cover is closed (e.g., in relation to the display unit 150). The cover unit 200 may be implemented as flip cover or as a part included in a folder phone. The cover unit 200 may include the cover sensor unit 260 in the form of being mounted on an inner surface of the cover or being attached and fixed to an outer surface thereof.

The cover sensor unit 260 measures a physical change amount generated in the cover 200.

The cover sensor unit 260 may include at least one of a gyroscope sensor, an acceleration sensor, a geo-magnetic sensor, a gravity sensor, a tilt sensor, and/or the like. The main body sensor unit 160 and the cover sensor unit 260 may both include a sensor of an identical type from among the above-described sensors. In addition to the above-described sensors, the cover sensor unit 260 may include at least one of an image sensor, a motion sensor, a temperature sensor, a proximity sensor, an environmental sensor, and/or the like. When a sensor is capable of detecting a physical change of the cover 200, the sensor may be included in the cover sensor unit 260.

According to various embodiments of the present disclosure, the cover sensor unit 260 may include sensors of types identical to the sensors included in the main body sensor unit 160. For example, the cover sensor unit 260 may include the same type of sensors included in the main body sensor unit 160. Such a structure may be implemented to measure a physical change amount generated only in the cover unit 200 with respect to the main body of the electronic device 100 by comparing sensing values measured by sensors of an identical type respectively included in the cover 200 and the main body of the electronic device 100.

Figure 2:
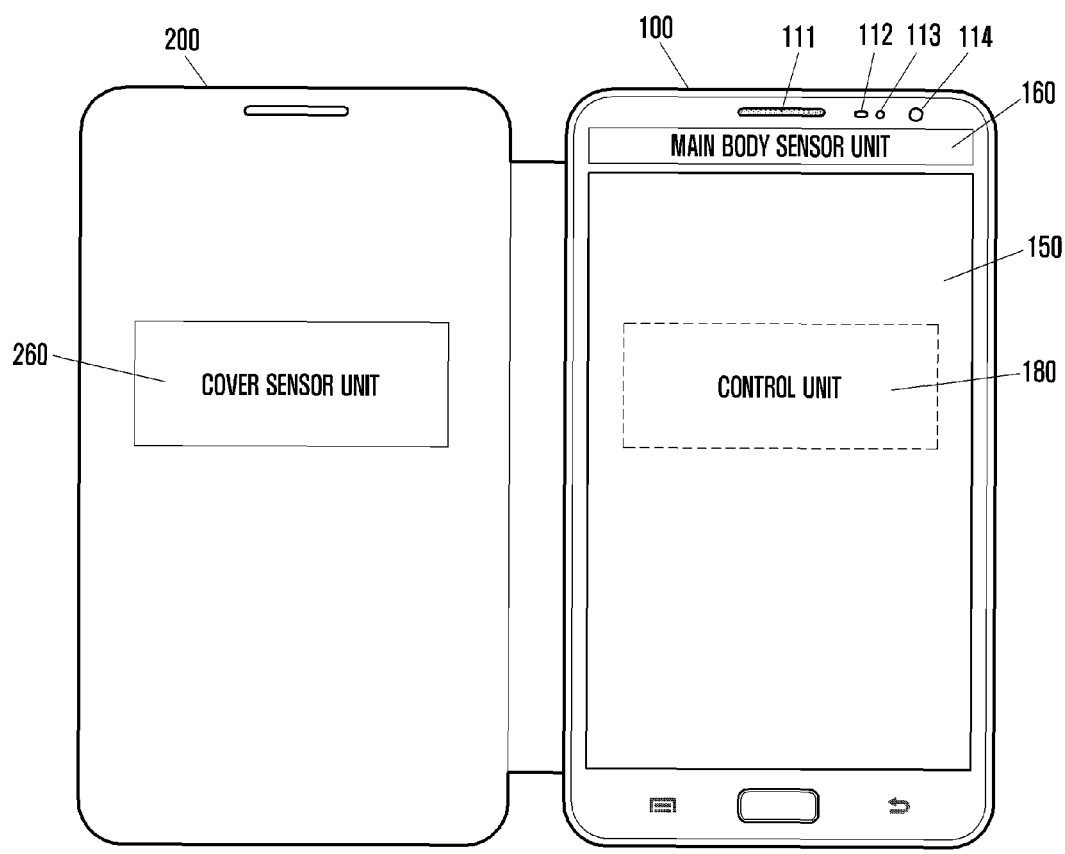
FIG. 2 is a view schematically illustrating a front side of an electronic device in which a flip cover is opened according to an embodiment of the present disclosure.
Figure 3:
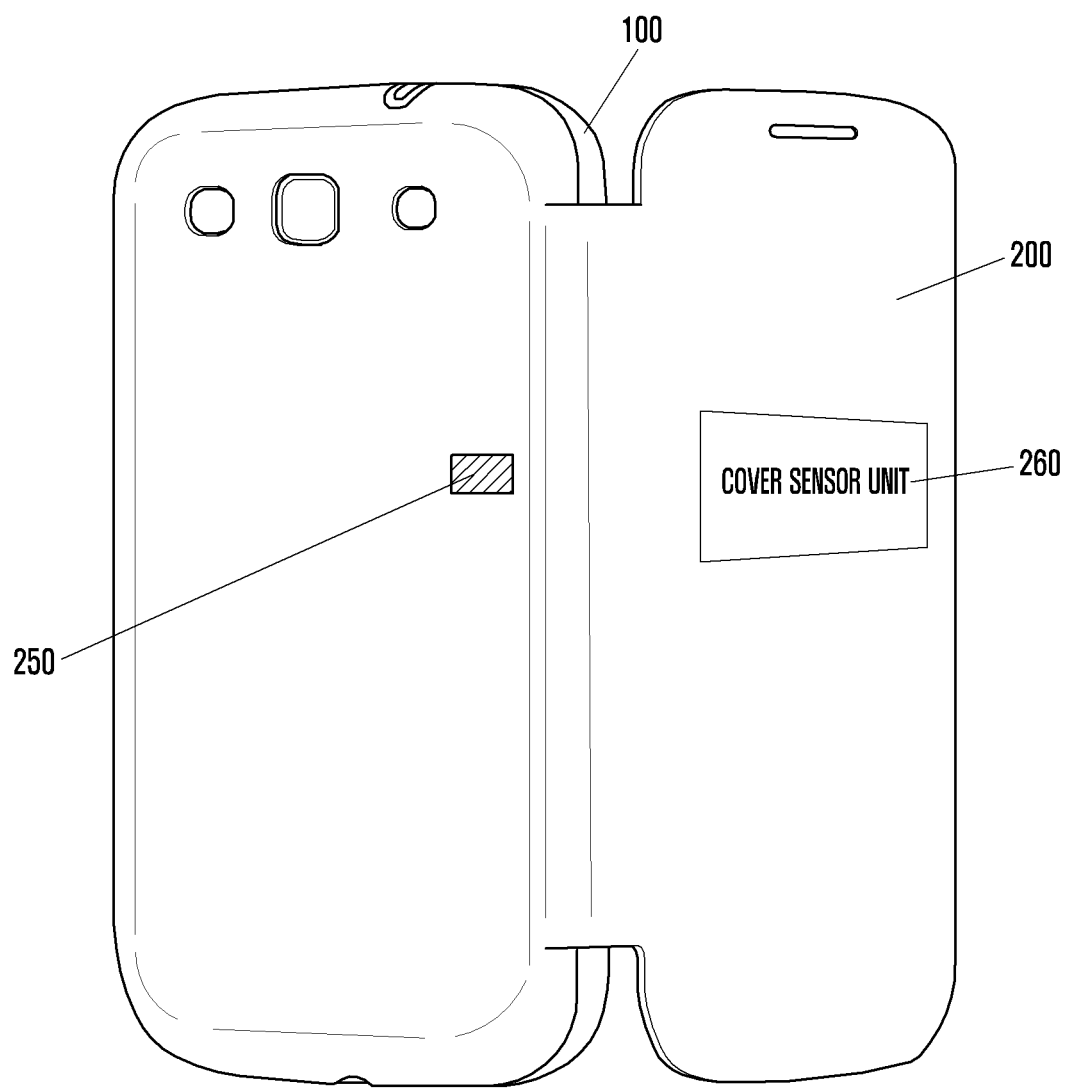
FIG. 3 is a view schematically illustrating a rear side of an electronic device on which a cover is mounted according to an embodiment of the present disclosure.

FIG. 2 is a view schematically illustrating a front side of an electronic device in which a flip cover is opened according to an embodiment of the present disclosure. FIG. 3 is a view schematically illustrating a rear side of an electronic device on which a cover is mounted according to an embodiment of the present disclosure.

Referring to FIGS. 2 and 3, the electronic device supporting execution control using the cover according to an embodiment of the present disclosure includes the main body of the electronic device 100 and the cover 200. The cover 200 will be described as an embodiment to which a flip cover is applied.

The main body of the electronic device 100 includes the display unit 150, the speaker 111, an infrared sensor 112, an illuminance sensor 113, a camera 114, and the main body sensor unit 160. The main body sensor unit 160 may be disposed in an area outside the display unit 150, may be connected to the control unit 180, and may be mounted outside or inside the main body of the electronic device 100. Alternatively, in some cases, the main body sensor unit 160 may be included in the control unit 180.

The cover 200 includes the cover sensor unit 260 at a part thereof. The cover sensor unit 260 may be disposed at an upper end of the flip cover 200 so as to correspond with the disposition of the main body sensor unit 160. Alternatively, the cover sensor unit 260 may be disposed at a part of the cover 200 other than the upper end of the flip cover 200. Alternatively, the cover sensor unit 260 may be mounted outside or inside the cover 200. The cover sensor unit 260 may be electrically connected to the control unit 180 within the main body of the electronic device 100 through a pogo pin 250 illustrated in FIG. 3. As an example, the pogo pin 250 may be mounted to a part of the cover 200 matched to or otherwise integrated with a rear surface of the main body of the electronic device 100, and may be connected to the control unit 180 through an electrical contact thereof.

The cover 200 is provided with the following structure. The cover 200 is detachable/attachable from/to the main body of the electronic device 100. When the cover 200 is opened about one axis which is a boundary between the cover 200 and the main body of the electronic device 100, a front surface of the main body of the electronic device 100 is exposed. In contrast, when the cover 200 is closed about the one axis, the front surface of the main body of the electronic device 100 is covered.

Meanwhile, although not illustrated, according to various embodiments of the present disclosure, the cover 200 and the main body of the electronic device 100 may be matched to (or otherwise correspond to) a folder-type cover and a main body of a folder-type mobile communication terminal, respectively. The folder-type cover has a configuration of being connected to the main body and serving to display an operation, input data, and the like of the folder-type mobile communication terminal. The main body of the electronic device 100 has a configuration of including principal elements such as a microchip, and/or the like of the folder-type mobile communication terminal Those skilled in the art will understand that the folder-type cover may include a cover sensor unit matched to the cover sensor unit 260 according to various embodiments of the present disclosure and the main body of the electronic device 100 may include a main body sensor unit matched to (or otherwise corresponding to) the main body sensor unit 160 according to an embodiment of the present disclosure.

FIG. 4 is a circuit diagram illustrating an example of a circuit that connects a cover sensor unit to a main chip according to an embodiment of the present disclosure. FIG. 5 is a view illustrating a comparison of data acquired through a cover sensor unit with data acquired through a sensor unit of a main body according to an embodiment of the present disclosure.

According to various embodiments of the present disclosure, the cover sensor unit and the main body sensor unit acquire physical change amounts on the X-axis, Y-axis and Z-axis, as sensing values.

Referring to FIG. 4, when the cover 200 is mounted on the main body of the electronic device 100, the cover sensor unit 260 may be connected to the control unit 180 through the pogo pin 250. The pogo pin 250, for example, may be implemented in a spring load type.

The cover sensor unit 260 may be implemented in the form of one chip including a power supply terminal 261 which receives power (VDD) from the main body of the electronic device 100, a communication terminal 262 which exchanges data with the control unit 180, and an earth terminal 263 (e.g., a ground). A sensing value that the cover sensor unit 260 has detected through the communication terminal 262 may be delivered to the control unit 180.

The control unit 180 may be implemented as a Micro Controller Unit (MCU) which is not a large-scale processor such as an AP, is separated from the AP, and manages only various sensors. According to various embodiments of the present disclosure, although the main body sensor unit 160 and the cover sensor unit 260 are always turned on, the control unit 180 may be driven with low power. The main body sensor unit 160 and the cover sensor unit 260 may directly transmit a particular signal and/or the like to the MCU, and the MCU may be driven separately from the AP.

Referring to FIG. 5, when almost identical physical changes are generated in the main body of the electronic device 100 and the cover 200, data acquired through the cover sensor unit 260 is shown to be similar to data acquired through the main body sensor unit 160. When the data acquired through the cover sensor unit 260 is similar to the data acquired through the main body sensor unit 160 as described above, the control unit 180 may determine that this case does not correspond to a situation for execution control using the cover 200 in the main body of the electronic device 100 and corresponds to a flip cover non-use state. Based on this determination, the control unit 180 does not control execution in the main body of the electronic device 100 according to a sensing value of the cover sensor unit 260.

In contrast, when different physical changes are generated in the main body of the electronic device 100 and the cover 200, data acquired through the cover sensor unit 260 is shown to be different from data acquired through the main body sensor unit 160 so as to meet or exceed a predetermined criterion (e.g., such that the different physical changes are statistically relevant, or are physical changes beyond a threshold difference). Specifically, there is a large difference between values of left data and those of right data on the X-axis, Y-axis and Z-axis of a graph matched to a case in which the flip cover is used. When the data acquired through the cover sensor unit 260 is shown to be different from the data acquired through the main body sensor unit 160 so as to meet or exceed the predetermined criterion as described above, the control unit 180 may determine that this case corresponds to a situation for execution control using the cover 200 in the main body of the electronic device 100, namely, a flip cover use state. Accordingly, the control unit 180 may control execution in the main body of the electronic device 100 according to a sensing value of the cover sensor unit 260.

According to various embodiments of the present disclosure, the control unit 180 receives data acquired through the cover sensor unit 260 and data acquired through the main body sensor unit 160, as a sensing value of the cover sensor unit 260 and the sensing value of the main body sensor unit 160. The control unit 180 compares the sensing value of the cover sensor unit 260 with the sensing value of the main body sensor unit 160. Based on a result of the comparison, the control unit 180 determines whether a difference between the two sensing values meets a preset criterion (e.g., whether the difference between the two sensing values is statistically relevant). According to various embodiments of the present disclosure, the preset criterion may be set for a case in which a difference between the data acquired through the cover sensor unit 260 and the data acquired through the main body sensor unit 160 is greater than or equal to a particular threshold. The case in which the difference between the two data values is greater than or equal to the particular threshold may be recognized as a situation in which an execution command is input by using the cover 200 during a cover control mode.

When the difference between the two data values is greater than or equal to the particular threshold, the control unit 180 extracts an execution command matched to the data acquired through the cover sensor unit 260, from the mapping table. According to various embodiments of the present disclosure, based on the data acquired through the cover sensor unit 260, the control unit 180 may determine whether the cover 200 is opened or closed, and may detect an open angle.

According to various embodiments of the present disclosure, the control unit 180 controls execution in the electronic device according to the execution command extracted in response to the acquired data. The above-described method for execution control using the cover 200 in the electronic device by the control unit 180 will be described in detail below with reference to FIGS. 6, 7, 8, 9, and 10.

FIGS. 6, 7, 8, and 9 are views for explaining execution control using a cover in an electronic device according to various embodiments of the present disclosure.

Figure 6:
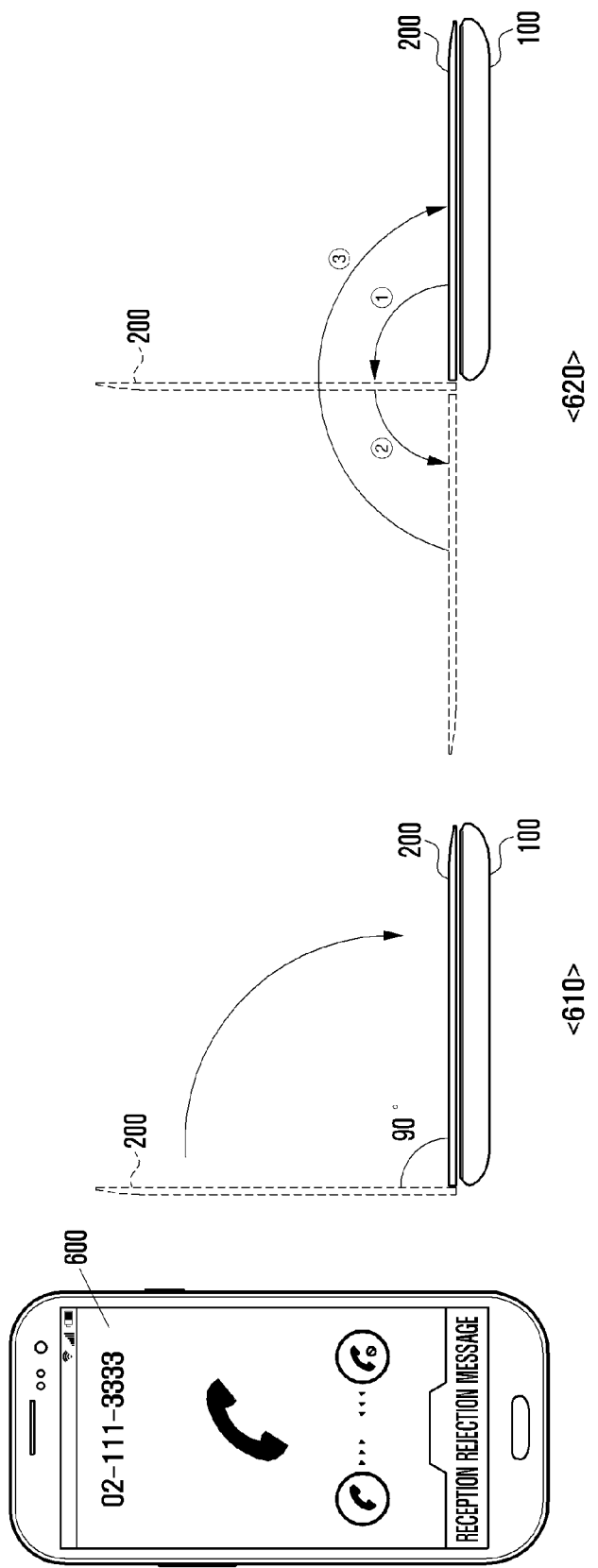

Referring to FIG. 6, as illustrated in screen 610, the cover 200 may be closed in relation to the electronic device 100. For example, a front surface of the cover 200 may be at a first position in which the cover 200 is at a 90 degree angle in relation to the front surface of the electronic device 100, and the cover 200 may be moved (e.g., rotated) so as to be closed in relation to the electronic device 100 (e.g., such that a surface of the cover 200 rests on the front surface of the electronic device 100).

As illustrated in screen 620, the cover 200 may be moved in relation to the electronic device 100. For example, the cover 200 may initially be in a closed position relative to the electronic device 100. Thereafter, the cover 200 may be moved (e.g., rotated) such that a front surface of the cover 200 may be at a first position (e.g., in which the cover 200 is at a 90 degree angle in relation to the front surface of the electronic device 100). The cover 200 may then be further moved (e.g., rotated) to a second position (e.g., such that a front surface of the cover 200 may be at a position in which the cover is at a 180 degree angle in relation to the front surface of the electronic device 100). Thereafter, the cover 200 may then be moved (e.g., rotated) to a third position so as to be closed in relation to the electronic device 100 (e.g., such that a surface of the cover 200 rests on the front surface of the electronic device 100).

Referring to FIG. 6, in a state in which the electronic device 100 is booted and an idle screen is displayed and in a state in which at least one application is executed, the electronic device 100 may receive a telephone call request. In addition, in a state in which the cover 200 is opened to expose or covers the front surface of the electronic device 100, the electronic device 100 may receive a telephone call request. When receiving the telephone call request, the electronic device 100 may display a telephone call request screen 600 on the display unit 150.

When in this state, the user opens and then closes the cover 200 within the first tilt range P illustrated in FIG. 7, the control unit 180 may execute a function of receiving a telephone call of a telephone call function application.

Alternatively, when a telephone call request is received, if the user opens and then closes the cover 200 within the second to fourth tilt ranges Q to S illustrated in FIG. 7, the control unit 180 may execute a function of rejecting the reception of a telephone call of the telephone call function application.

Figure 8:
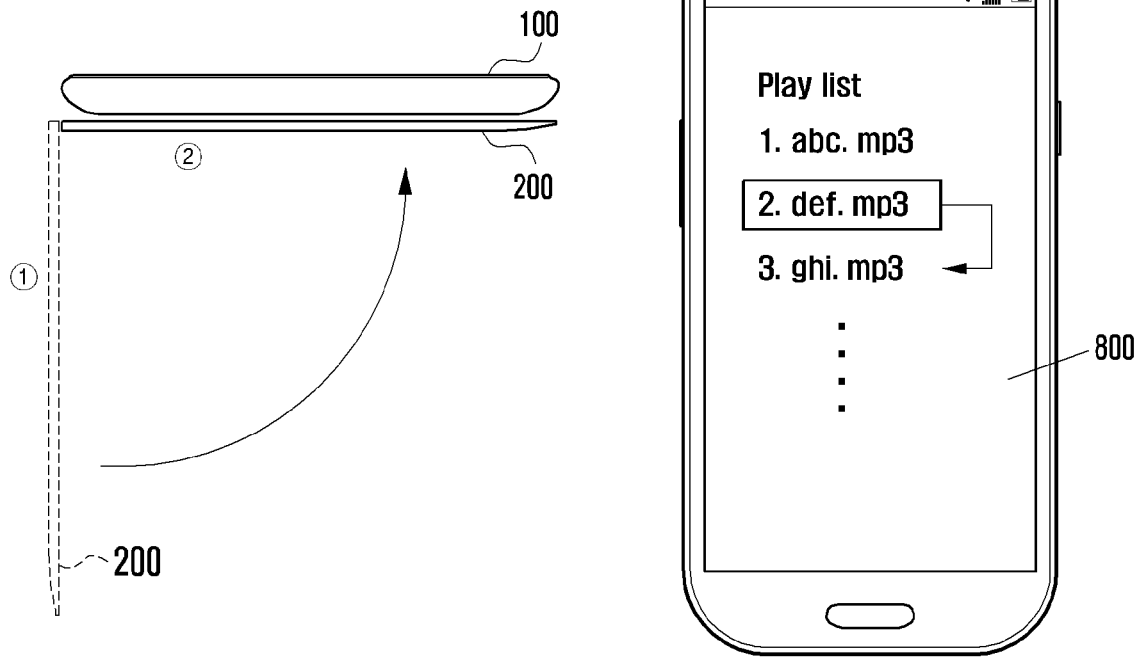

Before making a description with reference to FIG. 8, when the electronic device is booted and an idle screen is displayed, a menu for reproducing a sound source file may be selected by the user, a sound source reproduction function may be activated, and a list of sound sources capable of being reproduced by the activation of the sound source reproduction function among various content stored in the storage unit may be displayed on an execution screen 800.

When in this state, the user opens and then closes the cover 200 within the first to second tilt ranges P to Q illustrated in FIG. 7, the control unit 180 may execute a function of reproducing a next sound source according to order in the reproduction list with respect to a sound source reproduction application.

Alternatively, when the user opens and then closes the cover 200 within the third to fourth tilt ranges R to S illustrated in FIG. 7, the control unit 180 may execute a function of reproducing a previous sound source according to order in the reproduction list with respect to the sound source reproduction application.

Referring to FIG. 9, when the electronic device is booted and an idle screen is displayed, a menu for outputting image data may be selected by the user, an image output function may be activated, and a list of images capable of being output by the activation of the image output function among various content stored in the storage unit may be displayed on an execution screen 900. The list of images capable of being output by the activation of the image output function may be displayed as thumbnails or representations of the corresponding images. For example, as illustrated in FIG. 9, image 910 and image 920 may be displayed. A subset of the images capable of being output may be displayed. According to various embodiments of the present disclosure, the control unit 180 may selectively output an image according to an input from the cover 200 (e.g., according to a positioning and/or a movement of the cover in relation to the electronic device 100).

When in this state, the user opens and then closes the cover 200 within the first to second tilt ranges P to Q illustrated in FIG. 7, the control unit 180 may execute a function of outputting a next image according to order in the image list with respect to an image output application.

Alternatively, when the user opens and then closes the cover 200 within the third to fourth tilt ranges R to S illustrated in FIG. 7, the control unit 180 may execute a function of outputting a previous image according to order in the image list with respect to the image output application.

According to the various embodiments of the present disclosure described above with reference to FIGS. 6 to 9, the user may input an execution command by using the cover 200, instead of inputting the execution command to the main body of the electronic device 100. Accordingly, when the user cannot directly input an execution command to the main body of the electronic device 100, such as a situation in which the user puts on nonconductive gloves or a situation in which the user cannot input an execution command to the display unit 150 by using the user's fingers, the user generates a physical change by using the cover 200, and thereby flexibility can be provided which enables the user to immediately deliver the execution command to the main body of the electronic device 100.

In addition, a physical change is detected through the sensor included in each of the cover and the main body of the electronic device 100, sensing values of the two sensors are compared with each other. According to various embodiments of the present disclosure, only when a result of the comparison meets a preset criterion, execution in the main body of the electronic device 100 is controlled according to a physical change amount of the cover 200, so that the execution can be more accurately controlled without an error.

Figure 10:
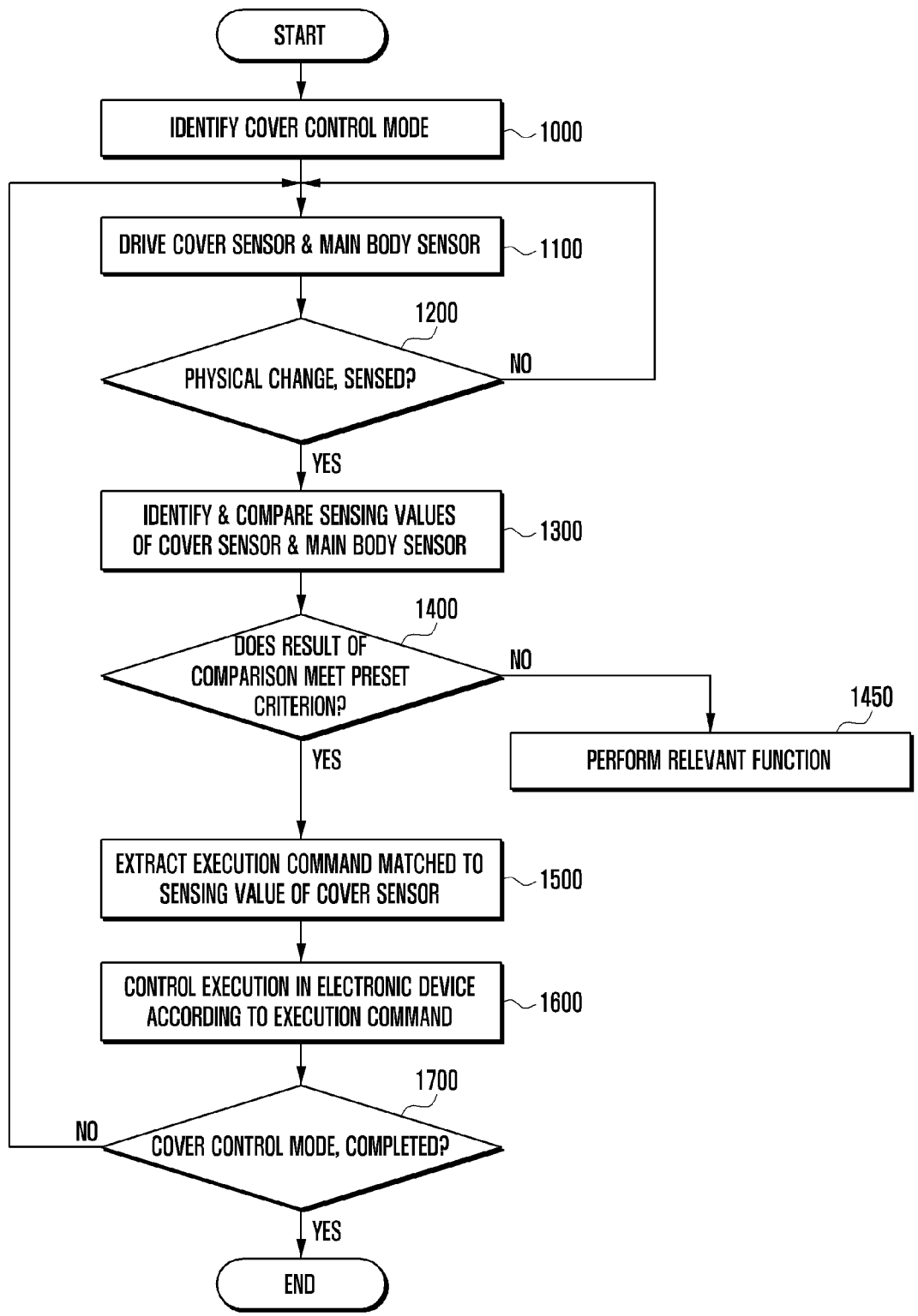
FIG. 10 is a flowchart illustrating a method for execution control in an electronic device having a cover according to an embodiment of the present disclosure.

FIG. 10 is a flowchart illustrating a method for execution control in an electronic device having a cover according to an embodiment of the present disclosure.

Referring to FIG. 10, a method for execution control in the electronic device 100 having the cover according to various embodiment of the present disclosure is provided. First, when power is supplied to the electronic device 100 (e.g., in response to power being supplied to the electronic device 100), the control unit 180 performs a control operation for initiating the elements of the electronic device 100 by using the supplied power.

At operation 1000, when the initiation has been completed, the control unit 180 may determine a cover control mode. For example, the control unit 180 may determine whether a current mode is the cover control mode. The cover control mode refers to a mode for controlling execution in the main body (e.g., of the electronic device 100) by using the cover mounted on the electronic device 100, and may be configured so as to be automatically turned on when the electronic device 100 is initiated. Alternatively, according to an option of the user, the cover control mode may be manually configured by a User Interface (UI) setting through a switch, an input key, and/or the like.

At operation 1100, the control unit 180 drives the main body sensor unit 160 and the cover sensor unit 260. Specifically, the electronic device 100 is supplied with power from an external power source or the battery, and is initiated. The control unit 180 may drive the main body sensor unit 160 and the cover sensor unit 260 by using power supplied from the external power source or the battery.

The main body sensor unit 160 is a sensor mounted inside the main body of the electronic device 100, and measures a physical change amount generated in the main body of the electronic device 100. Specifically, the main body sensor unit 160 may be designed such that the main body sensor unit 160 is disposed in an area (e.g., an area outside the touch panel) spaced apart from the touch panel and does not detect a touch generated from the touch panel, as a physical change amount. According to various embodiments of the present disclosure, such a structure may be implemented to detect a physical change amount generated by only the cover 200. According to various embodiments of the present disclosure, the main body sensor unit 160 may be implemented in a structure in which the main body sensor unit 160 is attached and fixed to an outer surface of the main body of the electronic device 100. In this regard, various examples may be applied to the disposition or structure of the main body sensor unit 160.

The cover sensor unit 260 is a sensor mounted inside or outside the cover mounted on the main body of the electronic device 100, and measures a physical change amount generated in the cover 200.

Each of the main body sensor unit 160 and the cover sensor unit 260 may include at least one of a gyroscope sensor, an acceleration sensor, a geo-magnetic sensor, a gravity sensor, a tilt sensor, and the like. The main body sensor unit 160 and the cover sensor unit 260 may both include a sensor of an identical type from among the above-described sensors.

At operation 1200, the control unit 180 determines whether a physical change is detected.

If the control unit 180 determines that a physical change is not detected at operation 1200, then the control unit 180 may return to operation 1100.

If the control unit 180 determines that a physical change is detected at operation 1200, then the control unit 180 may proceed to operation 1300 at which the control unit 180 determines sensing values of the cover sensor unit 260 and the main body sensor unit 160, and compares such sensing values. For example, the control unit 180 may detect a physical change through at least one of the main body sensor unit 160 and the cover sensor unit 260. The main body sensor unit 160 may detect a physical change generated in the main body of the electronic device 100. The cover sensor unit 260 may detect a physical change generated in the cover 200. For example, the cover sensor unit 260 including a tilt sensor may detect a change in a tilt of the cover 200.

At operation 1300, the control unit 180 determines and compares a sensing value of the main body sensor unit 160 and a sensing value of the cover sensor unit 260.

For example, when only the cover 200 is rotated by a predetermined angle by the user, a tile change value of the cover 200 may be acquired as a sensing value through the cover sensor unit 260 including a tilt sensor. In this case, only the cover 200 is rotated with the main body of the electronic device 100 as a reference, and thus a physical change amount is not acquired through a tilt sensor included in the main body sensor unit 160. As described above, a difference between the sensing value of the cover sensor unit 260 and that of the main body sensor unit 160 may be acquired as a result of the comparison.

At operation 1400, the control unit 180 determines whether a result of the comparison of sensing values satisfies a preset criterion. For example, the control unit 180 may determine whether a difference between the sensing values acquired through the cover sensor unit 260 and the main body sensor unit 160 meets the preset criterion.

If the control unit 180 determines that the result of the comparison does not statisfy the preset criterion at operation 1400, then the control unit 180 may proceed to operation 1450 at which the control unit 180 may perform a corresponding function.

If the control unit 180 determines that the result of the comparison satisfies the preset criterion at operation 1400, then the control unit 180 may proceed to operation 1500 at which the control unit 180 extracts an execution command matched to the sensing value of the cover sensor unit 260. For example, when the result of the comparison satisfies the preset criterion, the control unit 180 may determine a command and/or function corresponding to the result of the comparison.

The control unit 180 may identify a tilt range of the cover 200 by using the sensing value of the cover sensor unit 260. The range of the tilt of the cover 200, which has 360 degrees, may be divided into an n number of equal tilt ranges with the surface of the main body of the electronic device 100 as a reference. For example, when the 360 degrees are divided into n equal angles in a unit of 90 degrees, the range of the tilt of the cover 200 may be divided into a first tilt range representing 0 to 90 degrees, a second tilt range representing 90 to 180 degrees, a third tilt range representing 180 to 270 degrees, and a fourth tilt range representing 270 to 360 degrees, in a counterclockwise direction with the surface of the main body of the electronic device 100 as a reference. The division of the range of the tilt of the cover 200 is not limited to this example. Accordingly, the range of the tilt of the cover 200 may be variously divided so as to have one or more ranges according to the intention of the designer or the setting of the user.

The control unit 180 may extract an execution command matched to the sensing value of the cover sensor unit 260, from a mapping table. The execution command may be a function control command matched to any one of a currently-executed application, an application selected by the user, and an application previously set by the designer.

The mapping table is stored in such a manner as to map an execution command capable of controlling execution in the electronic device according to a sensing value of the cover sensor unit 260, and may be previously stored in the storage unit. Each of different executions in the electronic device may be mapped to a sensing value of the cover sensor unit 260, and each of the different executions in the electronic device mapped to the sensing value of the cover sensor unit 260 may be stored. Each of different executions in the electronic device, such as a telephone call function application, a music player application, a photograph album, a game function application and the like, may be mapped to a sensing value of the cover sensor unit 260, and each of the different executions in the electronic device mapped to the sensing value of the cover sensor unit 260 may be stored in the form of a mapping table. A user may configure different executions to be mapped to a sensing value of the cover sensor unit 260.

At operation 1600, the control unit 180 controls execution in the electronic device, according to the extracted execution command. Specifically, the control unit 180 may control the execution of a relevant application, according to the execution command stored in the mapping table in such a manner as to be mapped to the sensing value of the cover sensor unit 260 belonging to any one previously-divided range.

At operation 1700, the control unit 180 determines whether the cover control mode is completed.

If the control unit 180 determines that the cover control mode is not completed at operation 1700, then the control unit 180 may return to operation 1100, and may repeat the above-described process.

In contrast, if the control unit 180 determines that the cover control mode is completed at operation 1700, then the control unit 180 may complete the driving of the cover sensor unit 260 and that of the main body sensor unit 160. The completion of the cover control mode may be selected by a UI setting through a switch, an input key, an icon, and/or the like, according to an option of the user.

Meanwhile, the above-described electronic device may further include various additional modules according to a form of implementation thereof. Specifically, the electronic device may further include elements which have not been described above, such as a short-range communication module for short-range communication, an interface for transmitting and receiving data in a wired communication scheme or a wireless communication scheme of the electronic device, an Internet communication module for communicating with an Internet network and performing an Internet function, a digital broadcasting module for receiving and reproducing a digital broadcast signal, and/or the like. Such elements may be variously modified according to the convergence trend of digital devices, and cannot be all enumerated. However, the electronic device may further include elements equivalent to the above-described elements. In addition, a particular configuration may be excluded from the above-described configuration or may be replaced by another configuration according to the form of implementation thereof. This can be easily understood by those having ordinary knowledge in the technical field of the present disclosure.

According to various embodiments of the present disclosure, a method for execution control using the cover and the electronic device supporting the same, may be implemented in the form of program instructions executable through various computer means, and may be recorded in a non-transitory computer-readable recording medium. The non-transitory computer-readable recording medium may include a program command, a data file, and a data structure alone or a combination thereof. The program command recorded in the medium may be things specially designed and configured for the present disclosure, or things that are well known to and can be used by those skilled in the computer software related art.

The non-transitory computer-readable recording medium includes magnetic media such as hard disks, floppy disks and magnetic tapes, optical media such as a Compact Disc Read-Only Memory (CD-ROM) and a Digital Versatile Disc (DVD), magneto-optical media such as floptical disks, and hardware devices such as a ROM, a (RAM a flash memory, and/or the like, which are specially configured to store and perform program commands.

In addition, the program instructions may include high class language codes, which can be executed in a computer by using an interpreter, as well as machine codes made by a compiler. In addition, the above-described hardware device may be configured to operate as one or more software modules in order to perform an operation of the present disclosure.

Hereinabove, according to various embodiments of the present disclosure, a comparison is made between sensing values due to physical changes detected through sensors respectively included in the cover and the main body, execution in the main body is controlled according to the sensing value of the cover sensor when a result of the comparison meets a preset criterion. For example, execution in the main body may be controlled according to the sensing value of the cover sensor only when a result of the comparison meets a preset criterion. As a result, the execution can be more accurately and rapidly controlled.

Accordingly, according to the various embodiments of the present disclosure, execution in the main body of the electronic device can be immediately and rapidly controlled according to a physical change applied to the cover simultaneously with opening the cover, even without directly inputting an execution command to the main body of the electronic device.

For example, when an incoming signal or a notification signal is generated in a state in which the electronic device is covered by the cover, the user adjusts an open angle of the cover simultaneously with opening the cover, and thereby can input various execution control commands.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for execution control in a mobile electronic device having a cover, the method comprising:
    acquiring a sensing value of a cover sensor included in the cover and a sensing value of a main body sensor included in a main body of the mobile electronic device, due to a physical change generated in the mobile electronic device;
    identifying changes in a tilt angle between the cover and the main body, movement directions of the cover based on differences of sensing values of the cover sensor and sensing values of the main body sensor, and a movement speed of the cover; and
    executing functions corresponding to the identified changes in the tilt angle, the identified movement directions of the cover, and the identified movement speed of the cover.

2. The method of claim 1, wherein the identifying of the changes in the tilt angle, the movement directions of the cover, and the movement speed of the cover comprises:
    calculating a difference between the sensing values of the sensors of an identical type included in the main body and the cover; and
    identifying the changes in the tilt angle between the cover and the main body, the movement directions of the cover, and the movement speed of the cover based on the difference between the sensing values.

3. The method of claim 1, further comprising:
    extracting an execution command corresponding to the measured sensing value from a mapping table, in which a sensing value of the cover sensor mapped to an execution command for controlling execution in the main body is stored.

4. The method of claim 3, wherein the mapping table stores the sensing value of the cover sensor due to at least one of the changes in the tilt angle, the movement speed of the cover, and the movement directions of the cover, in such a manner as to be mapped to the execution command.

5. The method of claim 3, wherein the mapping table stores the different execution commands based on at least one tilt range divided in a unit of predetermined angle in a counterclockwise direction with a front surface of the main body as a reference.

6. The method of claim 1, further comprising:
turning on the cover sensor and the main body sensor according to activation of a cover control mode.

7. The method of claim 6, further comprising:
selecting at least one application, of which execution is controlled in response to the cover control mode.

8. A non-transitory computer-readable storage medium storing instructions that, when executed, cause at least one processor to perform the method of claim 1.

9. An apparatus for execution control in a mobile electronic device having a cover, the apparatus comprising:
a cover sensor unit, being included in the cover connected to one side of a main body of the mobile electronic device, configured to detect a physical change;
a main body sensor unit configured to detect a physical change of the main body, which is matched to the physical change; and
a control unit configured to:
identify changes in a tilt angle between the cover and the main body, movement directions of the cover based on differences of sensing values of the cover sensor unit and sensing values of the main body sensor unit, and a movement speed of the cover, and
execute functions corresponding to the identified changes in the tilt angle, the identified movement directions of the cover, and the identified movement speed of the cover.

10. The apparatus of claim 9, wherein the cover has a structure in which the cover is connected so as to be detachable/attachable from/to a rear surface of the main body, rotates about one axis and is opened to expose or covers a front surface of the main body, and comprises a flip cover.

11. The apparatus of claim 10, wherein the cover includes a pogo pin at a part of the cover matched to the rear surface of the main body, and is connected to the control unit through an electrical contact of the pogo pin.

12. The apparatus of claim 9, wherein the control unit is further configured to:
calculate a difference between the sensing values of the sensors of an identical type included in the main body and the cover, and
identify the changes in the tilt angle between the cover and the main body, the movement directions of the cover, and the movement speed of the cover based on the difference between the sensing values.

13. The apparatus of claim 9, wherein each of the cover sensor unit and the main body sensor unit includes a sensor of an identical type.

14. The apparatus of claim 9, further comprising:
a storage unit configured to store a mapping table configured by previously mapping the sensing value of the cover sensor unit to an execution command for controlling the execution in the main body.

15. The apparatus of claim 14, wherein the mapping table stores the sensing value of the cover sensor unit due to at least one of the changes in the tilt angle, the movement speed of the cover, and the movement directions of the cover, in such a manner as to be mapped to the execution command.

16. The apparatus of claim 14, wherein the mapping table stores the different execution commands based on at least one tilt range divided in a unit of predetermined angle in a counterclockwise direction with a front surface of the main body as a reference.

17. The apparatus of claim 9, wherein each of the cover sensor unit and the main body sensor unit comprises at least one of:
a gyroscope sensor;
an acceleration sensor;
a geo-magnetic sensor;
a gravity sensor;
a tilt sensor;
an image sensor;
a motion sensor;
a temperature sensor;
a proximity sensor; and
an environmental sensor.

18. The apparatus of claim 9, wherein the cover has a structure in which the cover is connected so as to be detachable/attachable from/to the one side of the main body, rotates about one axis and is opened to expose or covers a front surface of the main body.

* * * * *